US009032788B2

(12) United States Patent
Methil-Sudhakaran et al.

(10) Patent No.: US 9,032,788 B2
(45) Date of Patent: May 19, 2015

(54) COMMON RAIL SYSTEM FAULT DIAGNOSTIC USING DIGITAL RESONATING FILTER

(75) Inventors: Nandagopal Methil-Sudhakaran, Dunlap, IL (US); Daniel Reese Puckett, Peoria, IL (US); Frank Lombardi, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 625 days.

(21) Appl. No.: 13/446,438

(22) Filed: Apr. 13, 2012

(65) Prior Publication Data

US 2013/0275026 A1 Oct. 17, 2013

(51) Int. Cl.

| | |
|---|---|
| ***G01M 15/09*** | (2006.01) |
| ***F02M 65/00*** | (2006.01) |
| ***F02D 41/22*** | (2006.01) |
| *F02D 41/14* | (2006.01) |

(52) U.S. Cl.

CPC ........... *F02M 65/003* (2013.01); *F02D 41/221* (2013.01); *F02D 2041/1432* (2013.01); *F02D 2041/224* (2013.01)

(58) Field of Classification Search

USPC ............................ 73/114.38, 114.43, 114.51

See application file for complete search history.

(56) References Cited

U.S. PATENT DOCUMENTS

| | | | | |
|---|---|---|---|---|
| 5,493,902 | A | 2/1996 | Glidewell et al. | |
| 5,535,621 | A | 7/1996 | Glidewell et al. | |
| 6,481,273 | B2 | 11/2002 | Maloney | |
| 6,901,791 | B1 | 6/2005 | Frenz et al. | |
| 7,392,792 | B2 | 7/2008 | Puckett | |
| 7,516,652 | B2 | 4/2009 | Schulz et al. | |
| 7,533,563 | B2 | 5/2009 | Horak | |
| 7,835,852 | B2 | 11/2010 | Williams et al. | |
| 8,042,384 | B2 | 10/2011 | Bailey | |
| 2004/0020281 | A1 * | 2/2004 | Schilling et al. | 73/118.1 |
| 2005/0087004 | A1 * | 4/2005 | Brock | 73/119 A |
| 2006/0144130 | A1 * | 7/2006 | Eser et al. | 73/118.1 |
| 2006/0150723 | A1 * | 7/2006 | Delp et al. | 73/119 A |
| 2009/0049898 | A1 * | 2/2009 | Elkolaly | 73/114.43 |
| 2010/0251809 | A1 * | 10/2010 | Migueis et al. | 73/114.51 |
| 2011/0313639 | A1 * | 12/2011 | Hemmerlein et al. | 701/103 |
| 2012/0255348 | A1 * | 10/2012 | Hermes | 73/114.43 |
| 2013/0080032 | A1 * | 3/2013 | Kaneko et al. | 701/103 |

* cited by examiner

*Primary Examiner* — Eric S McCall

(74) *Attorney, Agent, or Firm* — BakerHostetler Liell & McNeil Attorneys, PC

(57) ABSTRACT

A common rail fuel system diagnostic algorithm is executed by an engine control and real time to detect and identify a faulty fuel system component. Rail pressure data is processed through a digital resonating filter having a resonance frequency corresponding to a fault signature. A peak magnitude and phase of the output from the digital resonating filter reveals a degradation level of a fuel injector, and a phase of the output identifies which fuel injector is faulted.

20 Claims, 5 Drawing Sheets

COMMON RAIL SYSTEM FAULT DIAGNOSTIC USING DIGITAL RESONATING FILTER

TECHNICAL FIELD

The present disclosure relates generally to detecting faults in a common rail fuel system of an electronically controlled engine, and more particularly to identifying a faulted fuel system component by processing rail pressure data through a digital resonating filter.

BACKGROUND

Common rail fuel systems supply pressurized fluid to a bank of fuel injectors from a common pressure controlled source known in the art as a common rail. In most instances, a high pressure pump directly driven by the engine supplies pressurized fluid to the common rail. Pressure in the common rail may be controlled in a variety of different ways using an electronic controller. Among these include returning metered quantities of pressurized fluid back to a low pressure storage tank to control rail pressure, as in some common rail fuel systems that utilize high pressure oil in a common rail to supply intensifying fluid to a bank of fuel injectors. Such systems are known as hydraulically actuated electronically controlled fuel systems. Another type of common rail system utilizes high pressure fuel that is directly supplied to individual fuel injectors for injection. Pressure in these types of common rail systems is often controlled at the pump utilizing either a spill control valve associated with each pump piston, or maybe a throttle inlet valve to control pump output and hence rail pressure in the common rail.

There has long been a desire in the art to detect faulty fuel system components by examining rail pressure data onboard and in real time. While there are known strategies for detecting fuel system faults by examining rail pressure data, all of these known strategies are processor intensive. Many electronic controllers for common rail fuel systems simply lack the processor capacity to simultaneously control engine operation and do the intensive processing necessary to detect a fuel system component fault by examining rail pressure data. For instance, U.S. Pat. No. 7,835,852 to Williams et al. teaches detection and identification of a faulty fuel system component by performing a Fourier transform on rail pressure data and comparing that transform to a supposed Fourier transform for a normal operating system.

The present disclosure is directed toward overcoming one or more of the problems set forth above.

SUMMARY

In one aspect, a method of diagnosing a common rail fuel system fault includes supplying fluid to individual fuel injectors from a common rail, and sensing fluid pressure in the common rail. A fault signature in rail pressure data is detected for an engine cycle by processing the rail pressure data through a digital resonating filter with a resonance frequency corresponding to the fault signature. A system fault is confirmed by repeating the detection of the fault signature for a plurality of engine cycles and comparing a peak magnitude of an output from the digital resonating filter to a predetermine threshold.

In another aspect, an electronically controlled engine includes fuel system fault diagnostics. The engine includes a common rail fuel system with a common rail having an inlet fluidly connected to a pump, and a plurality of outlets fluidly connected to respective fuel injectors. An electronic engine controller is in communication with the fuel injectors, a rail pressure control device and a rail pressure sensor. The electronic engine controller includes a fuel system fault diagnostic algorithm configured to detect a fault signature in rail pressure data for an engine cycle by processing the rail pressure data through a digital resonating filter with a resonance frequency corresponding to the fault signature. The fuel system fault diagnostic algorithm is also configured to confirm a system fault by repeating detection of the fault signature for a plurality of engine cycles and comparing a peak magnitude of an output from the digital resonating filter to a predetermined threshold.

DETAILED DESCRIPTION

Figure 1:
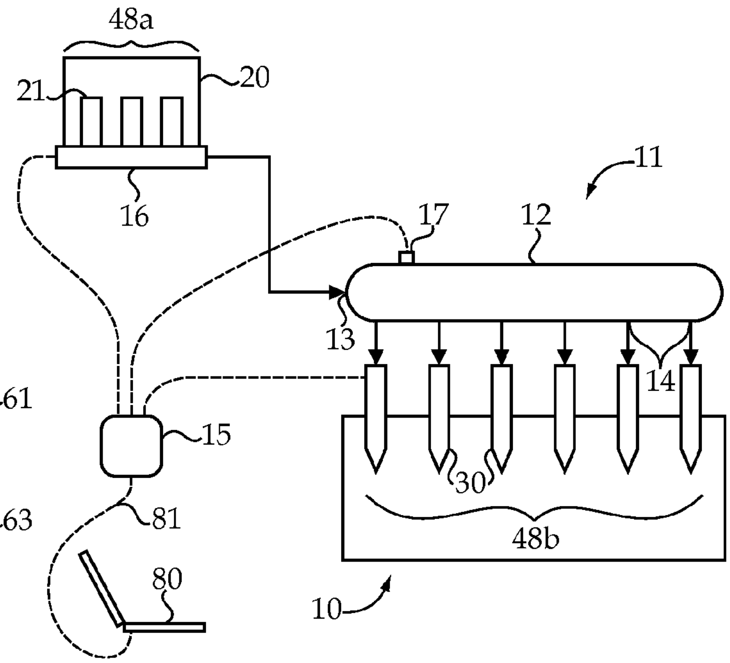
FIG. 1 is a schematic view of an electronically controlled engine according to the present disclosure.

Referring to FIG. 1, an electronically controlled engine 10 is equipped with fuel system fault diagnostics. Engine 10 includes a common rail fuel system 11 that includes a common rail 12 with an inlet 13 fluidly connected to a pump 20 and a plurality of outlets 14 fluidly connected to respective fuel injectors 30. Engine 10 includes an electronic engine controller 15 in communication with the fuel injectors 30, a rail pressure control device 16 and a rail pressure sensor 17. Rail pressure control device 16, as discussed in the background, can be located elsewhere in the system without departing from the present disclosure. In the illustrated exampled embodiment, pump 20 is shown as including three identical pump pistons 21 that are driven to produce pumping events a plurality of times each engine cycle. Although engine 10 is illustrated as a four stroke engine such that one engine cycle consists of 720° for the engine crank shaft rotation. The present disclosure could also apply to two cycle engines where each engine cycle corresponded to 360° of rotation for the engine crank shaft. Also shown in FIG. 1 are group 48*a* which encompasses three identical pump piston components, and Group 48*b* which encompasses six identical fuel injector components for example engine 10. Also shown is a service tool 80 in communication with electronic engine controller 15 via a communication line 81. Those skilled in the art will appreciate that the service tool 80 may normally not be in communication with electronic engine controller 15, but may be connected at a designated servicing location by a technician to receive data from electronic engine controller 15 in a known manner.

The electronic engine controller 15 includes a fuel system fault diagnostic algorithm that is configured to detect a fault signature in rail pressure data that may originate from the rail pressure sensor 17. The diagnostic works by processing the rail pressure data through a digital resonating filter with a resonance frequency corresponding to the fault signature. A system fault is confirmed by repeating the detection of the fault signature for a plurality of engine cycles, and by comparing a peak magnitude of an output from the digital resonating filter to a predetermine threshold. Those skilled in the art will appreciate that rail pressure data is, in modern systems, digital rather than analog in nature. The insight of the present disclosure is based upon the fact that a fuel system component failure will reveal itself in the rail pressure data. For instance, if a fuel injector fails to inject any fuel, that failure to inject fuel ought to reveal itself in the rail pressure data as a brief increase in rail pressure at about the time when the injection event should have taken place. In general, those skilled in the art will appreciate that each fuel injector injects fuel once per engine cycle. Thus, a brief surge in rail pressure should correspond in magnitude and phase with the amount of fuel that should have been injected and at the timing at which that fuel injection event failed. The present disclosure recognizes that a stuck closed fuel injector will reveal its fault at a frequency of once per engine cycle of 720°. Thus, a digital resonating filter having a resonance frequency corresponding to one peak per engine cycle should begin to resonate when a single injector becomes, for instance, stuck closed. Furthermore, the phase of the output from the digital resonating filter should correlate to which injector has failed since injection events for a bank of fuel injectors are distributed around each 720° engine cycle. In a similar manner, a failed pump piston for the common rail should reveal itself by brief pressure drops in rail pressure at a frequency corresponding to how many pumping events each pump piston performs in each 720° engine cycle. For instance, if a pump piston performs four pumping events each engine cycle, a digital resonating filter with the resonance frequency corresponding to four peaks per engine cycle should detect a failed pump piston, and the phase of the output from that digital resonating filter should reveal which of a plurality of pump pistons has failed to produce output to the common rail 12.

There are a number of ways in which the rail pressure data could be preprocessed, or how the digital resonating filter could be designed and how or when the output from the digital resonating filter could be processed. The foregoing discussion illustrates one example strategy for carrying out the insights of the present disclosure identified above. One initial way of making the problem easier would be to desensitized the rail pressure data from engine speed by associating the rail pressure data with engine angles prior to processing the data in a digital resonating filter. Those skilled in the art will appreciate that many existing modern common rail fuel systems already do this function by triggering rail pressure data readings responsive to a gear tooth associated with a certain angle passing a sensor trigger reading event. Thus, many modern systems already take rail pressure data readings at regular angle intervals in the engine cycle rather than based upon some clock time associated with a processor of the electronic engine controller 15. Thus, those skilled in the art will appreciate that if rail pressure data is initially associated with time rather than engine angle, that data may be preprocessed to desensitize the rail pressure data from the engine speed by associating the rail pressure data with engine angles by knowing the engine speed at the time of each rail pressure data measurement. On the otherhand, if the rail pressure data is not desensitized to engine speed, a digital resonating filter according to the present disclosure might have to have a frequency that changed with engine speed, making the problem of processing data substantially more cumbersome, but not impossible.

Another area that might be considered in making the problem of implementing the concepts of the present disclosure easier might be to include a high pass filter as part of the digital resonating filter so that low frequencies in the rail pressure data may be cut or suppressed during processing by the digital resonating filter so that the output from this filter oscillates about zero. Those skilled in the art will recognize that which low frequencies might needing to be cut are a function of the specific system to which the present disclosure is being applied. Without the high pass filter (low cut filter), the output from the digital resonating filter might oscillate about a moving target that varies with the lower frequencies occurring in these specific rail pressure system. While the utilization of a high pass filter is not essential, those skilled in the art will appreciate that correctly interpreting the output from the filter becomes measurably easier when the output oscillates around zero rather than some dynamic baseline that itself might be in a state of flux. For purposes of improving upon the basic concept by adding a high pass filter, if the rail pressure system time constant is around T seconds, then a general rule of thumb might be to cut all frequencies below 1/0.5T. Nevertheless, as stated above, the low frequencies that need to be removed in order to make the interpretation of the output from the digital resonating filter easier to understand is function of the specific system. Thus, engineers should understand their specific system and apply reasonable engineering judgment with regard to whether a high pass filter should be added to the digital resonating filter and what low frequencies should be removed in their system.

Figure 9:
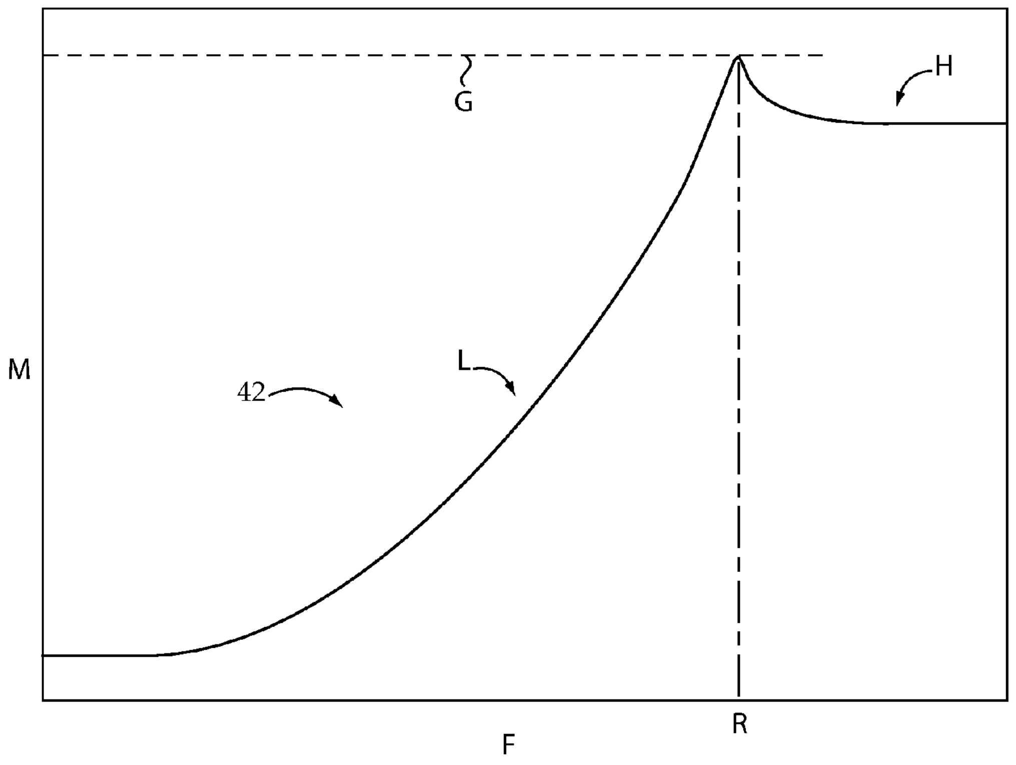
FIG. 9 is a graph of frequency response for an example digital resonating filter according to another aspect of the present disclosure.

Engineers might also need to make a decision on the speed of execution of the digital resonating filter. This may depend upon CPU availability and this speed will also determine filter coefficients. In order to develop a specific digital resonating filter, a transfer function might be developed that exhibits the resonance characteristics and low frequency cut characteristics established by the considerations set forth above. As stated above, a small amount of high pass filtering might also help. Since the samples to be processed may be collected in angle based intervals, the speed of execution of the processing of the rail pressure data through the digital resonating filter will also influence the filter coefficients. Referring to FIG. 9, and example frequency response plot of magnitude M verses frequency F for a digital resonating filter 42 according to the present disclosure is illustrated, the frequency response plot shows a region L where low frequencies are suppressed or cut, a region H showing the higher frequencies are allowed to pass and peak at frequency R where the Gain G to emphasize the presence of peaks in the data occurring at the resonance frequency R. In the case of attempting to identify a single injector failure, the digital resonating filter should seek to find one disturbance every 720° of crank angle. Thus, the digital resonating filter would have the characteristic of once per 720°. The filter should excite when driven by one disturbance every two crank shaft revolutions, and the disturbance should repeat at the same phase location in each engine cycle. In general, those skilled in the art will appreciate that smaller the interval between adjacent data points in the rail pressure data will produce a better noise to signal ratio, but may require a longer time to execute. Depending upon the CPU availability, a designer can determine an execution speed for the digital resonating filter, knowing that, in general, faster is better. Using these considerations, the once per 720° resonance might be converted into a specific resonance frequency in radians per second. For example, if the data is in X° samples, and executes at Y seconds execution speed, the resonance frequency R in Hertz might be expressed as X/720/Y. Next, the designer might need to identify which low frequencies ought to be eliminated in order to ease the interpretation of the output from the digital resonating filter 42. In general, any frequencies below the desired resonate frequency might be eliminated. The gain G at which you want to see the output oscillations from the digital resonating filter when a disturbance is present is a matter of choice. For instance, a 10-20 db will suffice and this choice will effect setting thresholds for comparing the output from the digital resonating filter in deciding whether a fault exists. Finally, using this information, the designer can develop a transfer function whose magnitude frequency response plot might look like the one shown in FIG. 9 based upon the above considerations.

Another design consideration might be whether to buffer rail pressure data prior to processing through a digital resonating filter or simply processing the data in parallel with all of the other demands on the electronic engine controller 15 in real time. For instance, in some applications, it may be desirable to buffer rail pressure data for one or more engine cycles, and then processing that data as processor time in the electronic engine controller 15 becomes available.

Another consideration when implementing a digital resonating filter according to the present disclosure includes avoidance of false fault diagnosing errors and correctly assessing the magnitude of a fault. Those skilled in the art will appreciate that, in the case of a degraded fuel injector, the brief pressure increase in the rail associated with the failure of the fuel injector to inject the commanded quantity of fuel will be related to the quantity of fuel that was not injected. In other words, a fully stuck closed fuel injector injects no fuel. However, those skilled in the art will appreciate that fuel injectors can exhibit degraded behavior such that the amount a faulted fuel injector injects may be anywhere from 0% of the commanded fuel injection quantity up to 100% of the commanded fuel injection quantity and everywhere in between. Because the magnitude of any resonance peak out of a digital resonating filter will be proportional to the magnitude of the input at that specific frequency, knowing how much fuel the injector was supposed to inject may be essential in correctly identifying a faulty injector. In other words, the present disclosure recognizes that the peak magnitude of the output from the digital resonating filter should be compared to a predetermined threshold that is based upon the desired fueling quantity in order to accurately assess what percentage of degradation was exhibited by the faulted fuel injector. In addition, those skilled in the art will appreciate that the strategy of the present disclosure may work best when the fuel injectors are being commanded to inject larger quantities of fuel rather than when the fuel injectors are being commanded to inject amounts closer to their minimal controllable quantities. Those skilled in the art will also appreciate that accurately diagnosing a fault may require that the missing quantity of fuel exceed some minimum threshold in order for the pressure change in the rail pressure dated to be robustly detectable. Those skilled in the art will appreciate that injectors may be commanded to inject a sequence of shots in each injection event but the rail pressure data may reveal only a single peak frequency reflecting a blend of a plurality of failed shots that occur close in time to one another.

Those skilled in the art appreciate that the process of implementing the present disclosure may begin with identifying those failure modes that are to be detected. For instance, one digital resonance filter may be designed for detecting a fully or partially stuck closed fuel injector, whereas a different digital resonating filter with a different resonance frequency may be utilized to detect a faulty pump piston. In addition, those skilled in the art will appreciate that other more complex failure modes may exist where two or more fuel injectors are simultaneously operated in a degraded faulty manner. These more complex failure modes will also have unique fault signatures that are different from one another, permitting design and implementation of digital resonating filters for each different failure mode of interest. For instance, two successive stuck closed fuel injectors will exhibit a fault signature in the rail pressure data that is different from either the fault signature for a single fuel injector failure, and also different from a fault signature associated with two faulty fuel injectors that do not inject fuel successively in the engine cycle. Thus, one could expect a practical application of the present disclosure to include processing the rail pressure data through a plurality of digital resonating filters with different resonance frequencies corresponding to different system faults.

A potential enhancement to the present disclosure might be to record rail pressure data upon determination of a fault so that the data can later be reviewed utilizing a service tool that establishes communication with the electronic engine controller 15 at a service location. This aspect of the disclosure is illustrated in FIG. 1 in which service tool 80 is in communication with electronic engine controller 15 via communication line 81, such as for instance to download rail pressure data associated with a diagnosed fault. Also, although not necessary, upon diagnosis of a system fault, the operator may be notified in a suitable manner such as via a dashboard message, light, buzzer or some other manner known in the art.

Figure 2:
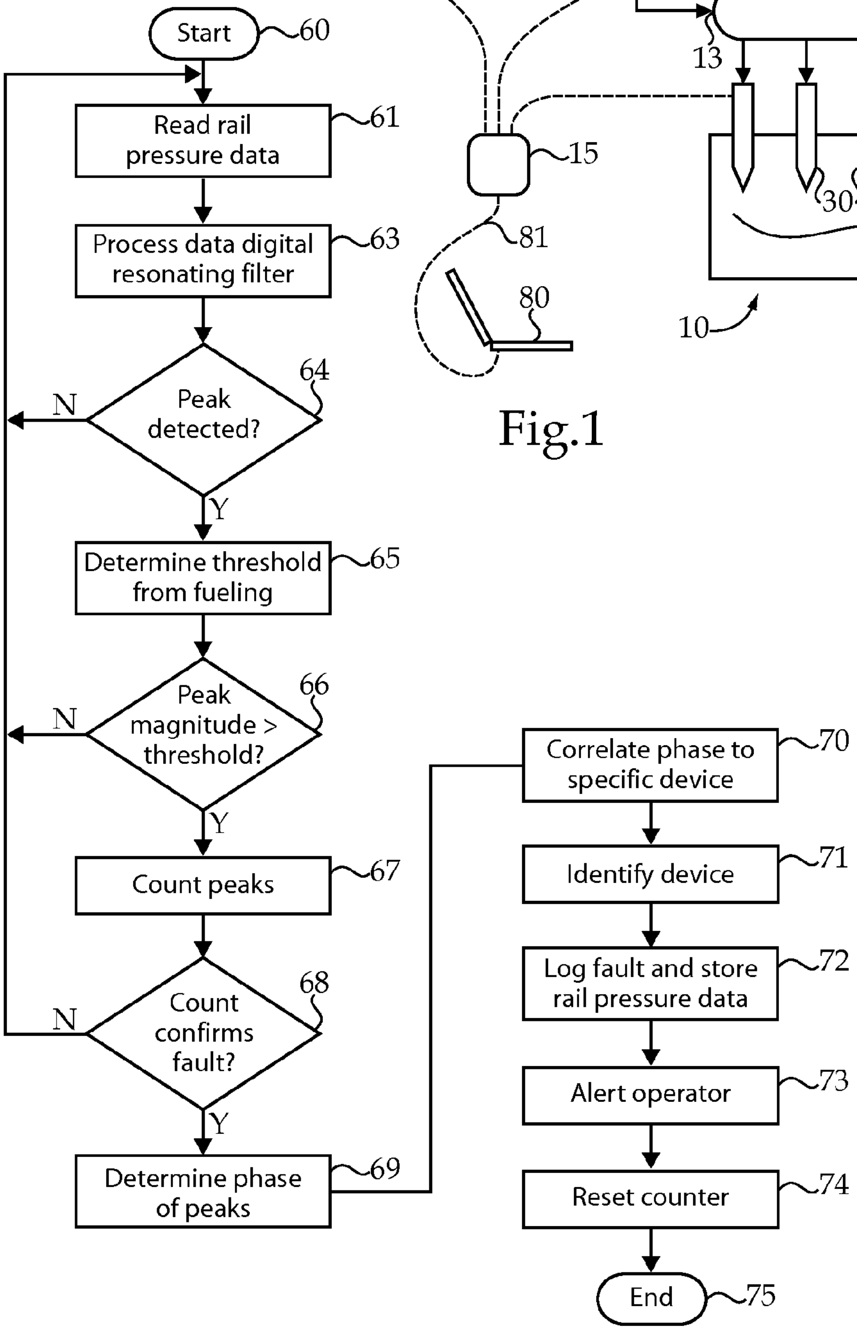
FIG. 2 is a logic flow diagram for a fuel system fault diagnostic algorithm according to another aspect of the present disclosure.

Referring now to FIG. 2, one exampled flow diagram for a fuel system fault diagnostic algorithm 40 according to the present disclosure is illustrated. The process begins at start 60 and proceeds to box 61 where the rail pressure data is read from the sensor 17. Rail pressure data is then processed through one or more digital resonating filters at step 63. Next, the output from the digital resonating filter is examined to determine whether a peak is present at query 64. If not, the logic loops back to again reread new rail pressure data. If a peak is detected, the fueling quantity at the time of the detected peak is determined, such as by noting the commanded fuel quantity at the time of the detected peak at step 65. Next, the peak magnitude from the output of the digital resonating filter is compared to the predetermined threshold which was based upon the desired fueling at the time of the detected peak at query 66. If the peak is not of sufficient magnitude, the logic again loops back to reread new rail pressure data. However, if the peak magnitude of the output of the digital resonating filter exceeds the predetermined threshold, the logic proceeds to a robustness strategy to confirm that a fault is actually present. For instance, the robustness aspect of the diagnostic may be accomplished in a number of ways such as counting the number of peaks in the output from the digital resonating filter that exceed the predetermined threshold at step 67 and then comparing that count to some predetermined number to confirm that a fault is present. Thus, an implementation of the present disclosure might require that the peak magnitude output of the digital resonating filter exceed the predetermined threshold for many engine cycles before the logic confirms the presence of a fault. If a fault is confirmed at query 68, at box 69 the logic determines the phase of the peaks output from the digital resonating filter. This phase is then correlated to the action angle of a specific device at box 70. For instance, this step relates to knowing at what engine angle each fuel injector injects fuel and then correlating the peaks in the digital resonating filter output to the action angle of the specific fuel injector. Next at box 71, the specific device among a plurality of identical fuel system components 48 is identified. Next, the fault may be logged and rail pressure data relating to that fault may be stored for later analysis, at box 72. At box 73 the operator may be alerted. At box 74, the counter may be reset in order to reset the logic in detecting an additional failure. At step 75, the logic ends.

INDUSTRIAL APPLICABILITY

The present disclosure finds potential application in any common rail fuel system. As used in the present disclosure, common rail fuel systems not only include common rail fuel systems in which the common rail contains pressurized fuel that is supplied to injectors and then injected into respective engine cylinders, the present disclosure also applies to common rails that supply pressurized oil or a different actuation fluid as a working fluid to hydraulically actuate fuel injectors to inject fuel, which may be different from the fluid contained in the common rail. The present disclosure can find potential application in identifying failure modes in engines with any number of cylinders, in systems with pumps having any number of pump pistons operated at any frequency, can apply equally well to both compression ignition engines and spark ignited engines.

Figure 3:
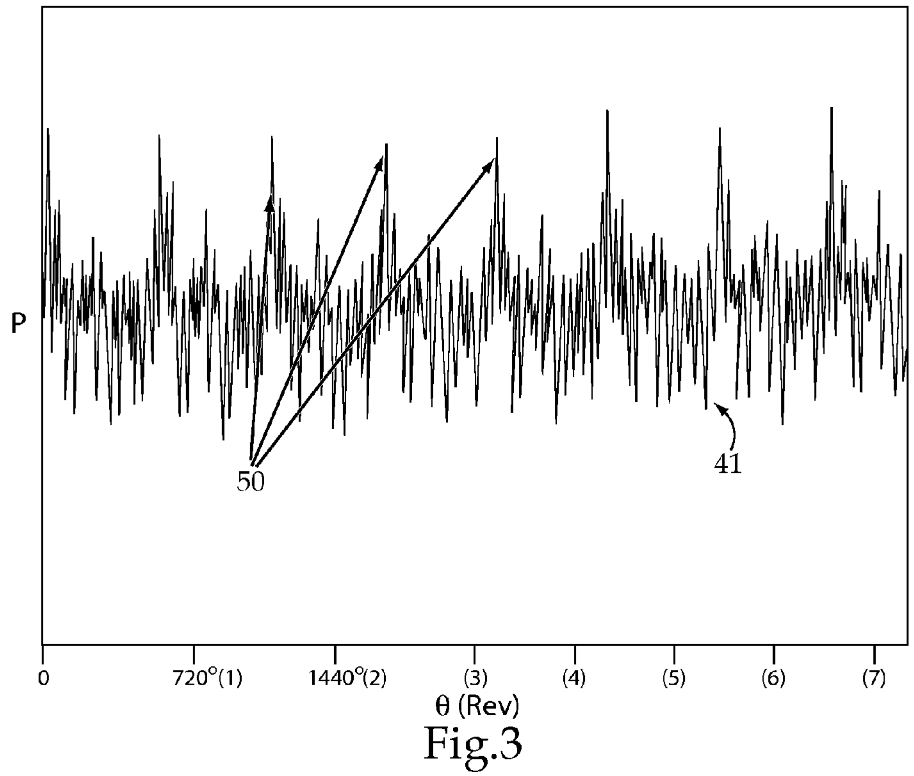
FIG. 3 is a graph of rail pressure data verses engine angle with a single faulted fuel injector.
Figure 4:
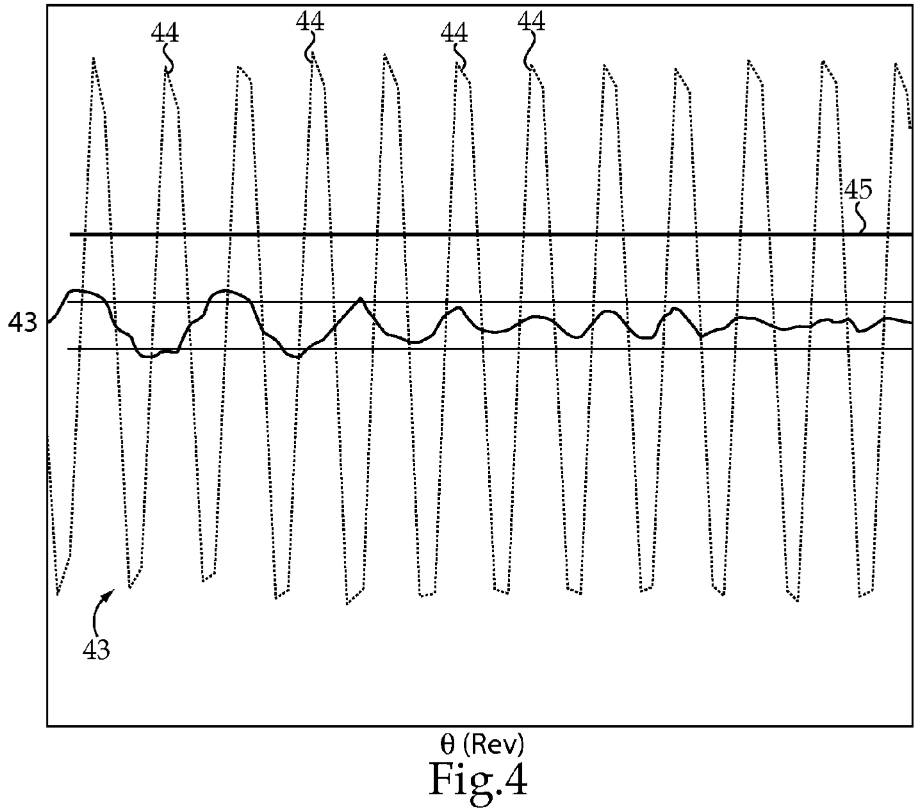
FIG. 4 is a graph of digital resonating filter output verses engine angle for rail pressure data with and without a faulted fuel injector.
Figure 5:
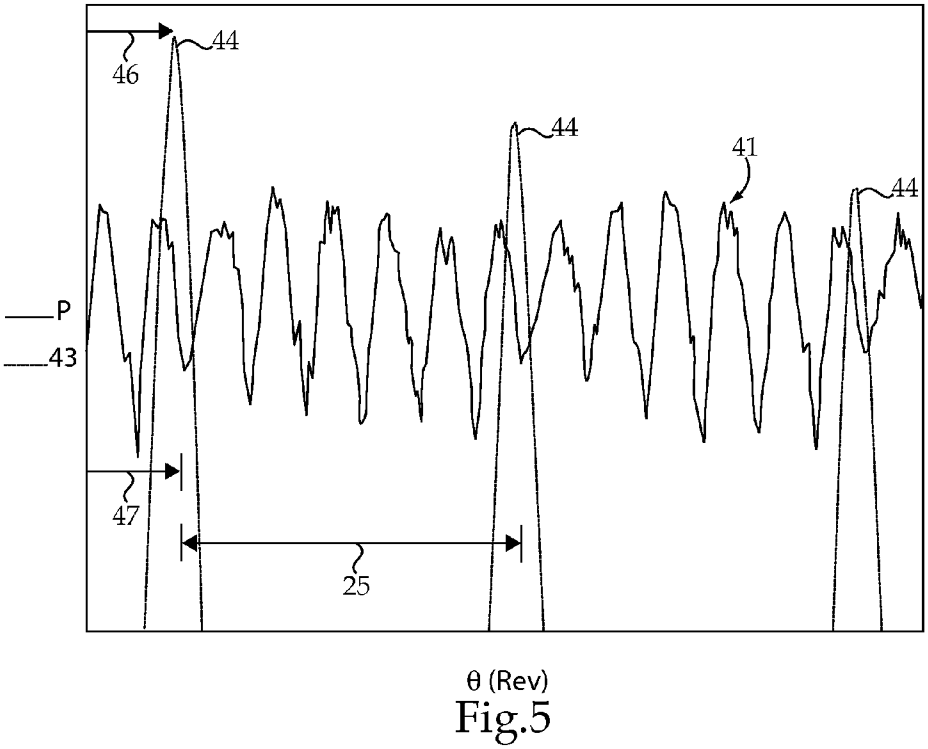
FIG. 5 is a superimposed graph of digital resonating filter output and rail pressure data for an example faulted condition according to the present disclosure.

When in operation, and referring back to FIGS. 1, 2 and in addition to the materials of FIGS. 3-8, when the engine is not in operation, fluid is supplied to individual fuel injectors 30 from common rail 12. Fluid pressure in the common rail 12 is sensed by a sensor 17 and communicated to electronic engine controller 15. A fault signature in the rail pressure data is detected for an engine cycle. FIG. 3 shows an example of low rail pressure data 41 for seven engine cycles of 720° each wherein one fuel injector is stuck closed such that a fault signature that includes pressure peaks 50 once per engine cycle exists in rail pressure data 41. If the rail pressure data 41 of FIG. 3 is then processed through a digital resonating filter 42 (FIG. 9) having a resonance frequency corresponding to one peak per engine cycle, the output may appear as output 43 with peaks 44 occurring at regular intervals corresponding to the injection frequency of the faulted fuel injector. FIG. 4 is also of interest for showing an example output with the solid line when no fuel injector faults are occurring. Also shown in FIG. 4 is an example predetermined threshold 45 that may be based upon the desired fueling level when the digital resonating filter resonated with peaks 44. Thus, because the peaks have a greater magnitude than the predetermined threshold 45, the logic would determine that a fuel injector event failure has occurred, and is repeating for a plurality of engine cycles. FIG. 5 is of interest for superimposing on the Y axis both the unprocessed rail pressure data 41 and the output 43 from the digital resonating filter. In this case, the phase 46 of the peaks 44 in the output 43 from the digital resonating filter correlate closely to the action angle 47 of the fuel injector that is failing to inject the desired quantity of fuel. The peaks may be separated by one engine cycle 25, which corresponds to 720° rotation of the crankshaft of the electronically controlled engine 10.

Figure 6:
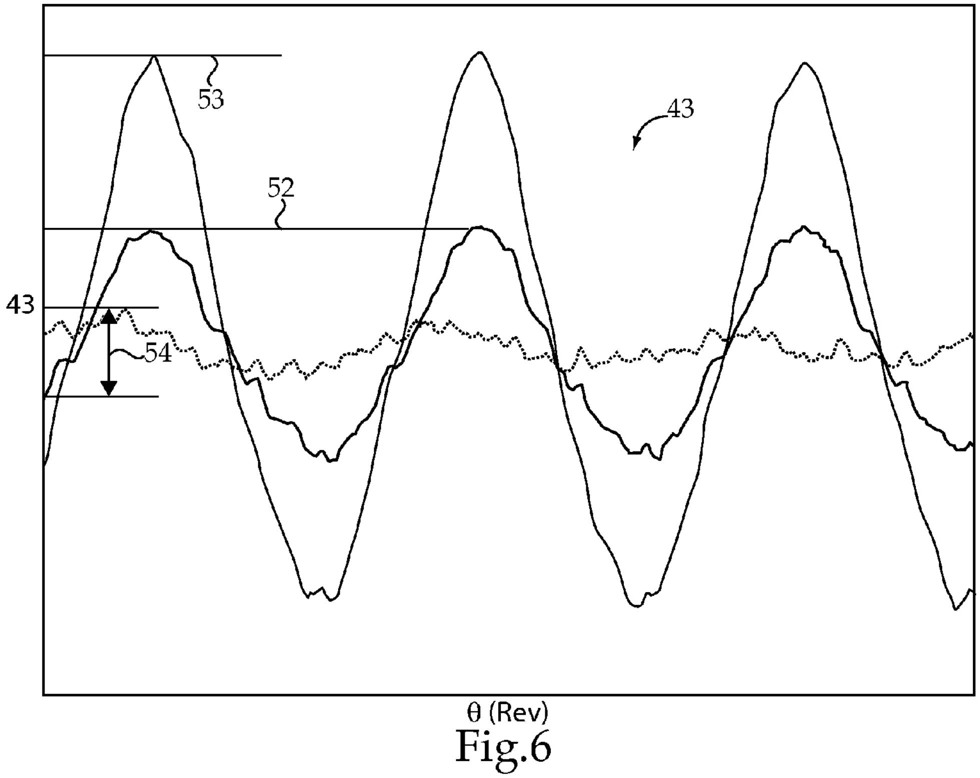
FIG. 6 is a graph showing digital resonating filter output for a fuel injector with different degradation levels according to the present disclosure.
Figure 7:
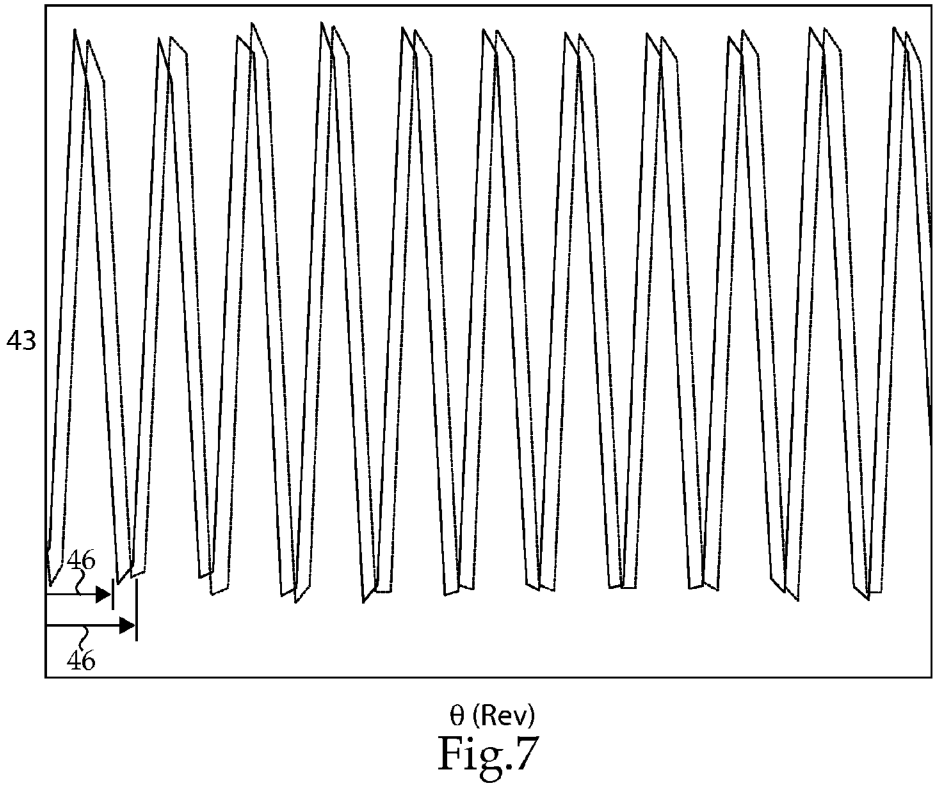
FIG. 7 is a graph showing digital resonating filter output phase difference for simulated fault of two different fuel injectors in a system.

FIG. 6 is of interest for showing that the output 43 from the digital resonating filter may be utilized to assess the degradation level of a faulted fuel injector. For comparison purposes, the output 54 shows output data when no fault is present. The curve that shows the peak 53 illustrates when the faulted fuel injector is injecting 0% of the desired amount of fuel corresponding to a completely stuck closed fuel injector. Finally, peaks 52 illustrate output from the digital resonating filter when the fuel injector that is faulted is still injecting 50% of the desired amount of fuel. Those skilled in the art will appreciate that the different percentages of fault still occur at the same frequency but the magnitude differs, as expected. Referring to FIG. 7, two exampled outputs 43 from a digital resonating filter for a faulted fuel injectors are shown, in which one curve represents a specific fuel injector in a bank failing, and the next curve represents the phase change when the fault is actually at the next fuel injector. For instance, the different phases 46 of the output 43 from the digital resonating filter may correspond to injector #1 in a bank of injectors whereas the second curve may indicate a failure in injector #2 in a bank of fuel injectors. As discussed earlier, the phase of the peaks from the output 43 of the digital resonating filter can be correlated to the failure of a specific fuel injector action angle when that fuel injector was supposed to inject a certain quantity of fuel.

Figure 8:
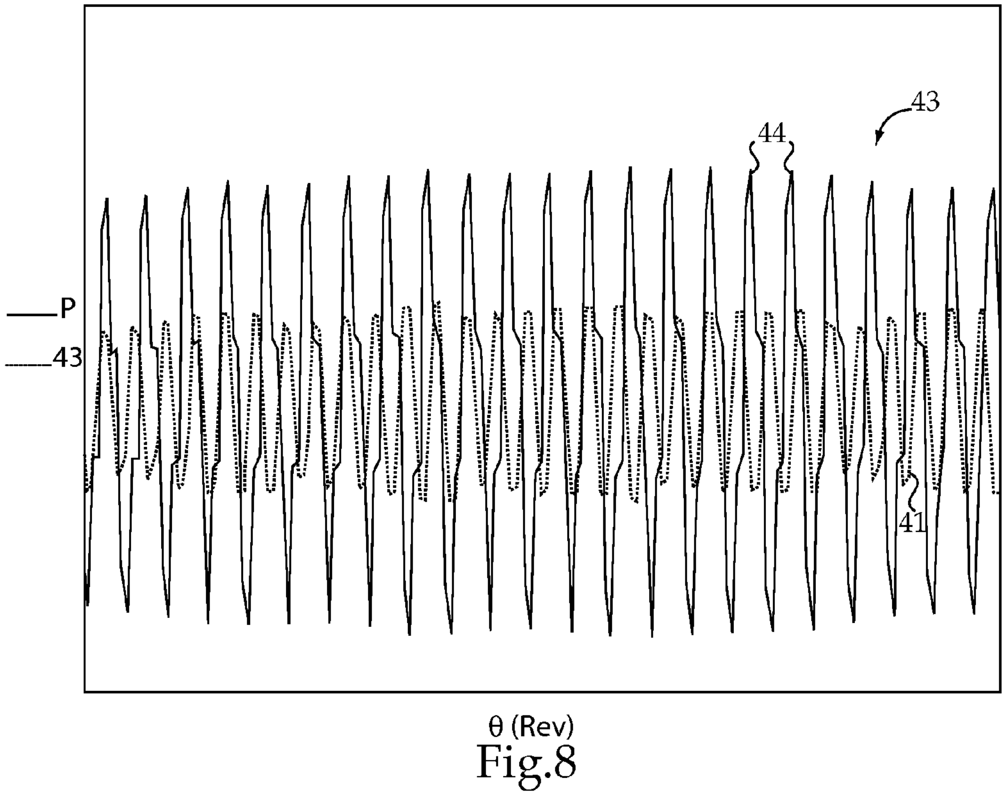
FIG. 8 is a graph of rail pressure data superimposed with digital resonating filter output verses engine angle for unfaulted and faulted pump piston failure.

Although the present disclosure is spent much time discussing fuel injector failures, the graphs of FIG. 8 show an example situation where one pumping element 21 and pump 20 fails to produce output and is compared to the rail pressure data 41 when no pump failure is present. Just like the fuel injectors, the peaks 44 indicate by phase correlation which pump piston 21 is failing, and the magnitude of those peaks can be compared to the desired output from each pump cycle to confirm that a failure is actually occurring.

The present disclosure has the advantage of monitoring rail pressure data for fault signatures associated with one or more failure modes of interest. This monitoring diagnostic can occur in real time, or be delayed utilizing a data buffering strategy. The diagnostic can also be implemented without over reliance upon CPU intensive operations associated with the prior art. Finally, the strategy is robust since only persistent disturbances created by a failed fuel system component over a plurality of engine cycles can cause the resonating to build up in amplitude to a level that allows confirmation of a system fault. By analyzing data associated with the system faults of interest, the fault signature can be utilized to reveal what new frequencies in the rail pressure data occur when that specific fault is present. Thus, the present disclosure allows for monitoring of rail pressure data for multiple different system faults of potential interest, in real time, and without demanding much processor time from the electronic engine controller.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of detecting a common rail fuel system fault, comprising the steps of:

supplying fluid to individual fuel injectors from a common rail;

sensing a fluid pressure in the common rail;

detecting a fault signature in rail pressure data for an engine cycle;

confirming a system fault by repeating detection of the fault signature for a plurality of engine cycles;

the detecting step includes processing the rail pressure data through a digital resonating filter with a resonance frequency corresponding to the fault signature; and the confirming step includes comparing a peak magnitude of an output from the digital resonating filter to a predetermined threshold.

2. The method of claim 1 including a step of desensitizing the rail pressure data from engine speed by associating the rail pressure data with engine angles prior to the processing step.

3. The method of claim 1 including a step of identifying a component fault by correlating a phase of the output from the digital resonating filter with an action angle associated with one of a plurality of identical fuel system components.

4. The method of claim 1 including a step of assigning a degradation level to a faulted fuel injector based upon a desired fueling volume and the peak magnitude of the output from the digital resonating filter.

5. The method of claim 1 wherein the digital resonating filter includes a high pass filter that blocks low frequencies in the rail pressure data so that the output of the digital resonating filter oscillates about zero.

6. The method of claim 1 wherein the resonance frequency corresponds to a degraded injection event in each of a plurality of engine cycles.

7. The method of claim 1 wherein the resonance frequency corresponds to a plurality of degraded of pumping events for a single pump piston in each of a plurality of engine cycles.

8. The method of claim 1 including a step of processing the rail pressure data through a plurality of digital resonating filters with different resonance frequencies corresponding to different system faults.

9. The method of claim 1 including a step of desensitizing the rail pressure data from engine speed by associating the rail pressure data with engine angles prior to the processing step;

identifying a component fault by correlating a phase of the output from the digital resonating filter with an action angle associated with one of a plurality of identical fuel system components; and assigning a degradation level to a faulted fuel injector based upon a desired fueling volume and the peak magnitude of the output from the digital resonating filter.

10. The method of claim 9 wherein the digital resonating filter includes a high pass filter that blocks low frequencies in the rail pressure data so that the output of the digital resonating filter oscillates about zero.

11. An electronically controlled engine with fuel system fault diagnostics comprising:

a common rail fuel system that includes a common rail with an inlet fluidly connected to a pump and a plurality of outlets fluidly connected to respective fuel injectors;

an electronic engine controller in communication with the fuel injectors, a rail pressure control device and a rail pressure sensor;

the electronic engine controller including a fuel system fault diagnostic algorithm configured to detect a fault signature in rail pressure data for an engine cycle by processing the rail pressure data through a digital resonating filter with a resonance frequency corresponding to the fault signature, and confirming a system fault by repeating detection of the fault signature for a plurality of engine cycles and comparing a peak magnitude of an output from the digital resonating filter to a predetermined threshold.

12. The electronically controlled engine of claim 11 wherein the fuel system fault diagnostic algorithm is also configured to desensitize the rail pressure data from engine speed by associating the rail pressure data with engine angles prior to the processing step.

13. The electronically controlled engine of claim 11 wherein the fuel system fault diagnostic algorithm is also configured to identify a component fault by correlating a phase of the output from the digital resonating filter with an action angle associated with one of a plurality of identical fuel system components.

14. The electronically controlled engine of claim 11 wherein the fuel system fault diagnostic algorithm is also configured to assign a degradation level to a faulted fuel injector based upon a desired fueling volume and the peak magnitude of the output from the digital resonating filter.

15. The electronically controlled engine of claim 11 wherein the digital resonating filter includes a high pass filter that blocks low frequencies in the rail pressure data so that the output of the digital resonating filter oscillates about zero.

16. The electronically controlled engine of claim 11 wherein the resonance frequency corresponds to a degraded injection event in each of a plurality of engine cycles.

17. The electronically controlled engine of claim 11 wherein the resonance frequency corresponds to a plurality of degraded of pumping events for a single pump piston in each of a plurality of engine cycles.

18. The electronically controlled engine of claim 11 wherein the fuel system fault diagnostic algorithm is also configured to record rail pressure data associated with a system fault for later downloading to a service tool that establishes a communication link to the electronic engine controller.

19. The electronically controlled engine of claim 11 wherein the fuel system fault diagnostic algorithm is also configured to process the rail pressure data through a plurality of digital resonating filters with different resonance frequencies corresponding to different system faults.

20. The electronically controlled engine of claim 11 wherein the fuel system fault diagnostic algorithm is also configured to desensitize the rail pressure data from engine speed by associating the rail pressure data with engine angles prior to the processing step;

identify a component fault by correlating a phase of the output from the digital resonating filter with an action angle associated with one of a plurality of identical fuel system components; and assign a degradation level to a faulted fuel injector based upon a desired fueling volume and the peak magnitude of the output from the digital resonating filter.

* * * * *